US012592620B2

(12) United States Patent
Boschman

(10) Patent No.: US 12,592,620 B2
(45) Date of Patent: Mar. 31, 2026

(54) ROTOR CORE MOLDING METHOD AND SYSTEM FOR MOLDING A ROTOR CORE OF AN ELECTRIC MOTOR

(71) Applicant: BOSCHMAN TECHNOLOGIES BV, Duiven (NL)

(72) Inventor: Franciscus Gerardus Johannes Boschman, Duiven (NL)

(73) Assignee: BOSCHMAN TECHNOLOGIES B.V., Duiven (NL)

( * ) Notice: Subject to any disclaimer, the term of this patent is extended or adjusted under 35 U.S.C. 154(b) by 209 days.

(21) Appl. No.: 18/546,787

(22) PCT Filed: Mar. 7, 2022

(86) PCT No.: PCT/NL2022/050122
§ 371 (c)(1),
(2) Date: Aug. 17, 2023

(87) PCT Pub. No.: WO2022/191699
PCT Pub. Date: Sep. 15, 2022

(65) Prior Publication Data
US 2024/0146160 A1 May 2, 2024

(30) Foreign Application Priority Data
Mar. 8, 2021 (NL) .................................... 2027722

(51) Int. Cl.
*B29C 45/02* (2006.01)
*B29C 45/04* (2006.01)
(Continued)

(52) U.S. Cl.
CPC ......... *H02K 15/12* (2013.01); *B29C 45/0408* (2013.01); *B29C 45/1742* (2013.01);
(Continued)

(58) Field of Classification Search
CPC ..... B29C 45/02; B29C 45/0408; B29C 45/14; B29C 45/1742; B29C 2045/2683;
(Continued)

(56) References Cited

U.S. PATENT DOCUMENTS

2016/0065040 A1 3/2016 Nagai et al.

FOREIGN PATENT DOCUMENTS

| JP | S4825749 A | 4/1973 |
| JP | S61154813 A | 7/1986 |

(Continued)

*Primary Examiner* — Leo B Tentoni
(74) *Attorney, Agent, or Firm* — NIXON & VANDERHYE

(57) ABSTRACT

A rotor core molding system, for molding magnets in an unmolded rotor core to provide a molded rotor core for an electrical motor, comprises first and second molds arranged to allow clamping at least one unmolded rotor core between the molds, a pre-adjustment arrangement for allowing to pre-adjust a distance between the molds in a preset open configuration of the molds to a pre-adjusted distance, and a mold closure arrangement for allowing to close the molds from the preset open configuration to a closed configuration by moving the molds towards one another to clamp unmolded rotor core(s) provided between the molds with a predetermined pressure in between the molds in the closed configuration. The pre-adjustment arrangement is configured to provide a relatively long-range distance movement, especially corresponding to one or more rotor core heights. The mold closure arrangement is configured to provide a relatively short-range distance movement.

20 Claims, 5 Drawing Sheets

(51) Int. Cl.

| | | |
|---|---|---|
| *B29C 45/14* | (2006.01) | |
| *B29C 45/17* | (2006.01) | |
| *B29C 45/40* | (2006.01) | |
| *B29C 45/66* | (2006.01) | |
| *B29C 45/67* | (2006.01) | |
| *H02K 1/276* | (2022.01) | |
| *H02K 15/03* | (2006.01) | |
| *H02K 15/035* | (2025.01) | |
| *H02K 15/12* | (2006.01) | |
| *H02K 15/121* | (2025.01) | |
| *B29C 45/26* | (2006.01) | |

(52) U.S. Cl.
CPC ............. *H02K 1/276* (2013.01); *H02K 15/03* (2013.01); *B29C 2045/2683* (2013.01); *B29C 2045/2691* (2013.01); *B29K 2995/0008* (2013.01); *H02K 2215/00* (2021.08)

(58) Field of Classification Search
CPC . B29C 2045/2691; B29C 45/40; B29C 45/66; B29C 45/67; B29K 2995/008; H02K 15/03; H02K 15/035; H02K 15/12; H02K 15/121; H02K 2215/00
USPC ....... 264/272.19, 297.2, 297.4, 297.8, 328.1, 264/334; 425/110, 450.1; 29/598
See application file for complete search history.

(56) References Cited

FOREIGN PATENT DOCUMENTS

| | | | |
|---|---|---|---|
| JP | S61290000 | A | 12/1986 |
| JP | H0560108 | A | 3/1993 |
| JP | 2006211748 | A | 8/2006 |

ROTOR CORE MOLDING METHOD AND SYSTEM FOR MOLDING A ROTOR CORE OF AN ELECTRIC MOTOR

FIELD OF THE INVENTION

The invention relates to a rotor core molding method and system for molding magnets in an unmolded rotor core to provide a molded rotor core for an electric motor, wherein an unmolded rotor core comprises a rotor core body having magnet cavities distributed around a longitudinal axis of the rotor core body and magnets inserted in the magnet cavities, the magnet cavities extend along the longitudinal axis between opposing first and second rotor core ends of the rotor core body, the rotor core body has a rotor core height as measured between the first and second rotor core ends, and the magnet cavities have an opening at one or both of the first and second rotor core ends to allow inserting the magnets and filling of the magnet cavities with a fluid molding material, and wherein a molded rotor core comprises the rotor core body having the magnets fixed in the magnet cavities by a cured molding material in the magnet cavities. The system comprises a first mold and a second mold arranged to allow clamping at least one unmolded rotor core between the first and second molds, and an arrangement to close the molds and provide for a clamping pressure by the molds.

BACKGROUND OF THE INVENTION

Such rotor core molding systems and corresponding methods are generally known. A single unmolded rotor core or a stack of unmolded rotor cores is provided between the molds after which a clamping pressure is set. A fluid molding material is provided into the magnet cavities of the unmolded rotor core(s) clamped between the first and second molds, which is subsequently allowed to cure within the magnet cavities to provide one or more molded rotor cores. The first and second molds are then opened and the rotor cores are removed from between the first and second molds.

The arrangement used for opening and closing of the molds have their limitations such as in the heights of various types of rotor cores that can be readily processed, the variety of stack heights of rotor cores that can be processed, processing of stacks of rotor cores having relatively large height variations, adaption to processing another batch of stacks having a different stack height, and process time in processing stacks of rotor cores. For instance, mechanical mold presses can only handle a small variation in stack heights. Due to such disadvantages, the known molding arrangements are not readily employed in robotized and/or automated manufacturing environments. Additionally, they do not provide for well-defined quality and process control to allow manufacturing within tightly set process boundaries, which is a requirement for automotive parts production.

SUMMARY OF THE INVENTION

It is an objective of the invention to provide a rotor core molding method and system that allows for efficient processing rotor core stacks that may have a different number of rotor cores in the stack.

It is another or alternative objective of the invention to provide a rotor core molding method and system that allows for efficient processing of various type of rotor cores of various different heights.

It is another or alternative objective of the invention to provide a rotor core molding method and system that allows for highly identical process conditions and/or traceability of the actual process conditions per rotor core unit processed.

It is yet another or alternative objective of the invention to provide a rotor core molding method and system that allows for full automatic (hands-off) implementation in a robotized manufacturing cell.

It is yet another or alternative objective of the invention to provide a rotor core molding method and system that allows for ready adaption such various process circumstance and requirements, such as conversion from single plunger to multi plunger molding and vice versa.

It is yet another or alternative objective of the invention to provide a rotor core molding method and system that allows for covering a large range of clamping pressures, for instance, in the range of 5-200 tons, without the need for any conversion parts.

In an aspect the invention provides for a rotor core molding method for molding magnets in an unmolded rotor core to provide a molded rotor core for an electric motor, wherein an unmolded rotor core comprises a rotor core body having magnet cavities distributed around a longitudinal axis of the rotor core body and magnets inserted in the magnet cavities, the magnet cavities extend along the longitudinal axis between opposing first and second rotor core ends of the rotor core body, the rotor core body has a rotor core height as measured between the first and second rotor core ends, and the magnet cavities have an opening at one or both of the first and second rotor core ends to allow inserting the magnets and filling of the magnet cavities with a fluid molding material, wherein a molded rotor core comprises the rotor core body having the magnets fixed in the magnet cavities by a cured molding material in the magnet cavities, and wherein the method comprises employing a displacement mechanism for displacing a first mold and a second mold of a rotor core molding system with respect to one another, and which defines an open configuration of the first and second molds for inserting an unmolded rotor core or a stack of unmolded rotor cores, that are stacked with their first and second rotor core ends onto one another such that magnet cavities of the stacked rotor cores are in communication with one another, in between the first and second molds with the first and second rotor core ends directed towards respective ones of the first and second molds, and for removing a molded rotor core or a stack of molded rotor cores, respectively, from in between the first and second molds; and a closed configuration of the first and second molds for clamping the unmolded rotor core or the stack of unmolded rotor cores, respectively, in between the first and second molds and for passing a fluid molding material into the magnet cavities to provide a molded rotor core or a stack of molded rotor cores, respectively, clamped between the first and second molds, wherein the displacement mechanism comprises a pre-adjustment arrangement and a mold closure arrangement;

employing the pre-adjustment arrangement to pre-adjust a distance between the first mold and the second mold in a preset open configuration of the first and second molds to a pre-adjusted distance corresponding to a clearance distance (d) plus a height (H) of the unmolded rotor core or the stack of unmolded rotor cores, respectively, to be processed to the molded rotor core or the stack of molded rotor cores, respectively, wherein the pre-adjustment arrangement is configured to provide a relatively long-range distance movement, especially corresponding to variations in height of various types of rotor cores and/or a height of one or more rotor cores of various types of rotor cores;

providing an unmolded rotor core or a stack of unmolded rotor cores between the first and second molds with the first and second rotor core ends directed towards respective ones of the first and second molds;

employing the mold closure arrangement to close the first and second molds from the preset open configuration to the closed configuration by moving the first and second molds towards one another to clamp the unmolded rotor core(s) with a predetermined pressure in between the first and second molds in the closed configuration, wherein the mold closure arrangement is configured to provide a relatively short-range distance movement corresponding to the clearance distance, and the long-range distance and the short-range distance are relative with respect to one another;

providing a fluid molding material into the magnet cavities of the unmolded rotor core(s) clamped between the first and second molds;

letting the fluid molding material cure within the magnet cavities to provide one or more molded rotor cores;

employing the mold closure arrangement to open the first and second molds from the closed configuration to the preset open configuration by moving the first and second molds away from one another; and removing the molded rotor core(s) from between the first and second molds.

In an aspect the invention provides for a rotor core molding system for molding magnets in an unmolded rotor core to provide a molded rotor core for an electrical motor, wherein an unmolded rotor core comprises a rotor core body having magnet cavities distributed around a longitudinal axis of the rotor core body and magnets inserted in the magnet cavities, the magnet cavities extend along the longitudinal axis between opposing first and second rotor core ends of the rotor core body, the rotor core body has a rotor core height as measured between the first and second rotor core ends, and the magnet cavities have an opening at one or both of the first and second rotor core ends to allow inserting the magnets and filling of the magnet cavities with a fluid molding material, wherein a molded rotor core comprises the rotor core body having the magnets fixed in the magnet cavities by a cured molding material in the magnet cavities, and wherein the system comprises a first mold and a second mold arranged to allow clamping at least one unmolded rotor core between the first and second molds; and a displacement mechanism for displacing the first mold and the second mold with respect to one another, and which defines an open configuration of the first and second molds for inserting an unmolded rotor core or a stack of unmolded rotor cores, that are stacked with their first and second rotor core ends onto one another such that magnet cavities of the stacked rotor cores are in communication with one another, in between the first and second molds with the first and second rotor core ends directed towards respective ones of the first and second molds, and for removing a molded rotor core or a stack of molded rotor cores, respectively, from in between the first and second molds; and a closed configuration of the first and second molds for clamping the unmolded rotor core or the stack of unmolded rotor cores, respectively, in between the first and second molds and for passing a fluid molding material into the magnet cavities to provide a molded rotor core or a stack of molded rotor cores, respectively, clamped between the first and second molds, wherein the displacement mechanism comprises a pre-adjustment arrangement configured to pre-adjust and define a distance between the first and second molds in a preset open configuration of the first and second molds to a pre-adjusted distance corresponding to a clearance distance plus a height of the unmolded rotor core or the stack of unmolded rotor cores, respectively, to be processed to the molded rotor core or the stack of molded rotor cores, respectively, wherein the pre-adjustment arrangement is configured to provide a relatively long-range distance movement, especially corresponding to variations in height of various types of rotor cores and/or a height of one or more rotor cores of various types of rotor cores; and a mold closure arrangement configured to close the first and second molds adjusted from the preset open configuration to the closed configuration by moving the first and second molds towards one another to clamp unmolded rotor core(s) provided between the first and second molds with a predetermined pressure in between the first and second molds in the closed configuration, and to open the first and second molds from the closed configuration to the preset open configuration by moving the first and second molds away from one another, wherein the mold closure arrangement is configured to provide a relatively short-range distance movement corresponding to the clearance distance, and the long-range distance and the short-range distance are relative with respect to one another.

The method and system according to the invention have various key advantages. A large variation in stack heights can be handled, and variations in stack heights will be automatically compensated without the need for making adjustments. The method and system can be employed in a fully robotized manufacturing cell. Automatic height compensation, for instance, ensures, inter alia, that for each similar rotor stack the processing conditions, such as with respect to clamping force, bleed, flash control, etcetera, and quality achieved are highly identical. This is especially important for automotive parts production, for which quality and process control need to be executed within tightly set process boundaries and manufacturing conditions need to traceable for each unit processed. The pre-adjustment arrangement defines a preset open configuration of the first and second molds, from which preset open configuration the molds are closed to the closed configuration by the mold closure arrangement. The preset open configuration defined by the pre-adjustment arrangement provides a clearance distance in addition to the height of the rotor core(s) to be processed to allow inserting the unmolded rotor core or the stack of unmolded rotor cores in between the first and second molds and to remove the molded rotor core or the stack of rotor cores, respectively, from in between the first and second molds. The pre-adjustment arrangement can be specifically configured for the requirements of pre-adjusting to a required distance between the first and second molds in the preset open configuration, such as, for instance, a relatively long travel range and the ability to withstand a high clamping pressure by the mold closure arrangement. The mold closure arrangement can be configured to the specific requirements for closing the first and second molds from the preset open configuration to the closed configuration, such as, for instance, high clamping pressure, reliable clamping pressure and rapid closing and opening in between the preset open configuration and closed configuration.

In an embodiment the mold closure arrangement comprises a mold closure actuator to open and to close the first and second molds.

In an embodiment the mold closure actuator comprises a hydraulic drive, optionally a servo controlled hydraulic drive.

In an embodiment the molding system comprises a frame, the first and second molds are arranged on the frame, and the pre-adjustment arrangement is arranged to act between the frame and one of the first and second molds.

In an embodiment the mold closure arrangement is configured to act between the frame and said one of the first and second molds to open and to close the first and second molds.

In an embodiment the mold closure arrangement has a mold closure pre-adjustment part that is attached to said one of the first and second molds and that is movable by the pre-adjustment arrangement in a decoupled state in which the mold closure pre-adjustment part is decoupled from the frame for allowing to adjust the distance between the first and second molds to the pre-adjusted distance, and that is movable with respect to the pre-adjustment arrangement in a coupled state in which the mold closure pre-adjustment part is coupled to the frame for allowing to open and to close the first and second molds by the mold closure arrangement acting on said one of the first and second molds.

In an embodiment the mold closure arrangement comprises a mold closure coupling part that is configured and arranged to allow to couple the mold closure pre-adjustment part to the frame for providing the coupled state of the mold closure pre-adjustment part, and to decouple the mold closure pre-adjustment part from the frame for providing the decoupled state of the mold closure pre-adjustment part.

In an embodiment the mold closure coupling part is movable to be removable out of contact with the mold closure pre-adjustment part to provide for the decoupled state of the mold closure pre-adjustment part, and to be movable into contact with the mold closure pre-adjustment part to provide for the coupled state of the mold closure pre-adjustment part.

In an embodiment the mold closure actuator is provided on the frame, and the mold closure coupling part is configured and arranged to be removable from a position between the mold closure actuator and the mold closure pre-adjustment part to provide for the decoupled state of the mold closure pre-adjustment part, and to be insertable into a position between the mold closure actuator and the mold closure pre-adjustment part to provide for the coupled state of the mold closure pre-adjustment part.

In an embodiment the mold closure coupling part comprises at least one movable rod.

In an embodiment the pre-adjustment arrangement comprises a pre-adjustment actuator to adjust the distance between the first and second molds to the pre-adjusted distance.

In an embodiment the pre-adjustment actuator comprises a mechanical displacement drive, optionally a spindle drive, optionally a servo-controlled spindle drive.

In an embodiment the pre-adjustment arrangement comprises a pre-adjustment table arranged to support one of the first and second molds for allowing to pre-adjust a distance between the first and second molds.

In an embodiment the pre-adjustment actuator acts between the frame and the pre-adjustment table.

In an embodiment one or both of the first and second molds allow guiding a fluid molding material to the magnet cavities of the unmolded rotor core(s) clamped between the first and second molds.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
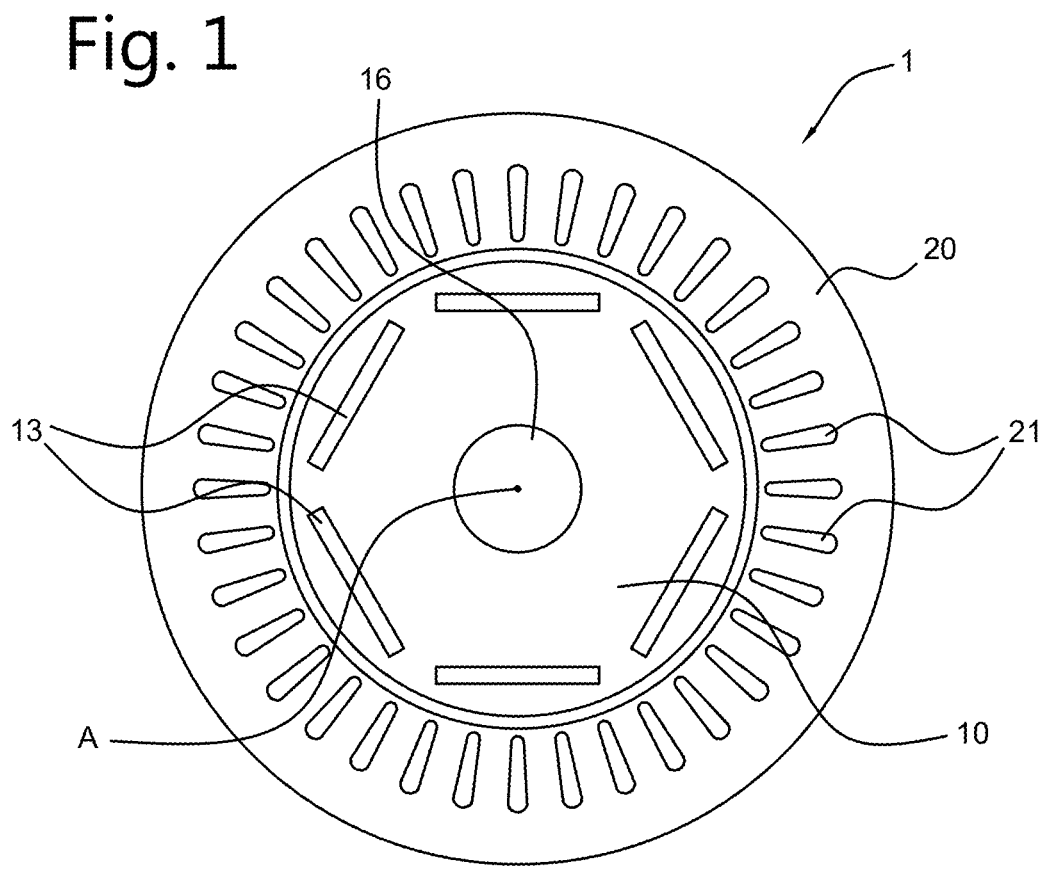
FIG. 1 shows a cross-section of an electrical motor.

FIG. 1 shows a cross-section of an electric motor 1, especially an electric motor for driving a vehicle such as a car, the electric motor having a rotor core 10 and a stator 20. The stator has electrical windings 21 for an electrical current inducing a magnetic field interacting with a magnetic field of permanent magnets 13 of the rotor 10 so as to drive the rotor core 10 into rotation. Generally, electric motors may have a large variety of configurations for the electrical windings and magnets. An axle or shaft 16 mounted in a central opening 15 of the rotor core 10 along axis A is driven into rotation by driving the rotor core 10 into rotation. The shaft 16 is the driving shaft of the electric motor 1 for transferring rotation of the electric motor to a driven assembly.

Figure 2A:
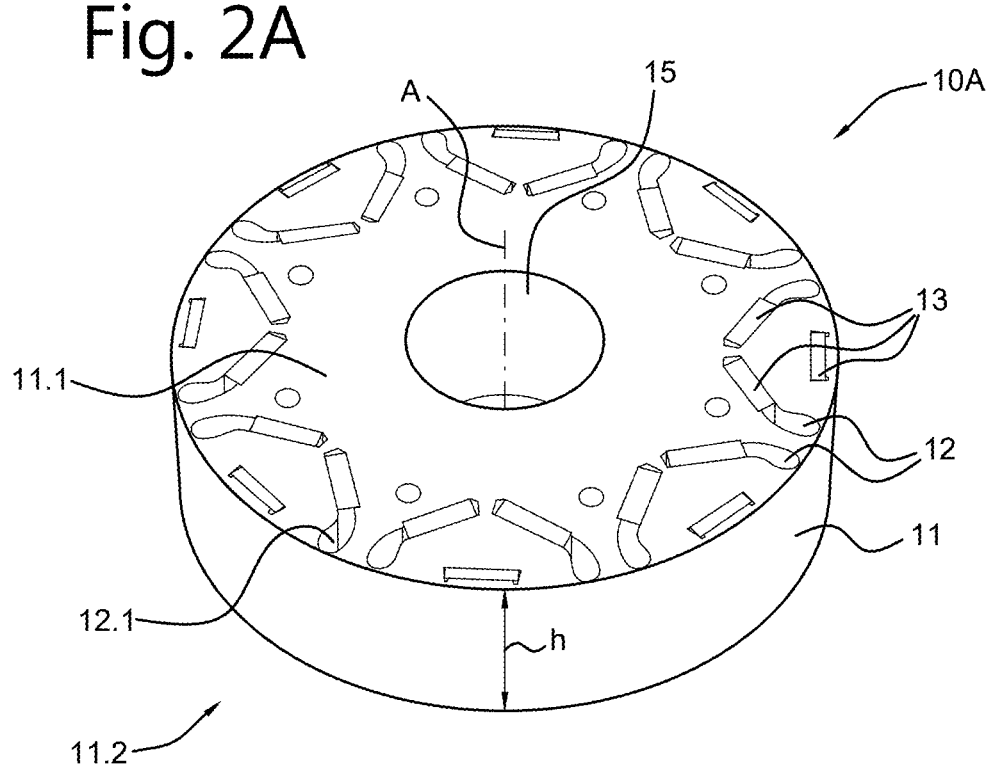
FIG. 2A shows an unmolded rotor core with magnets inserted in magnet cavities of a rotor core body.
Figure 2B:
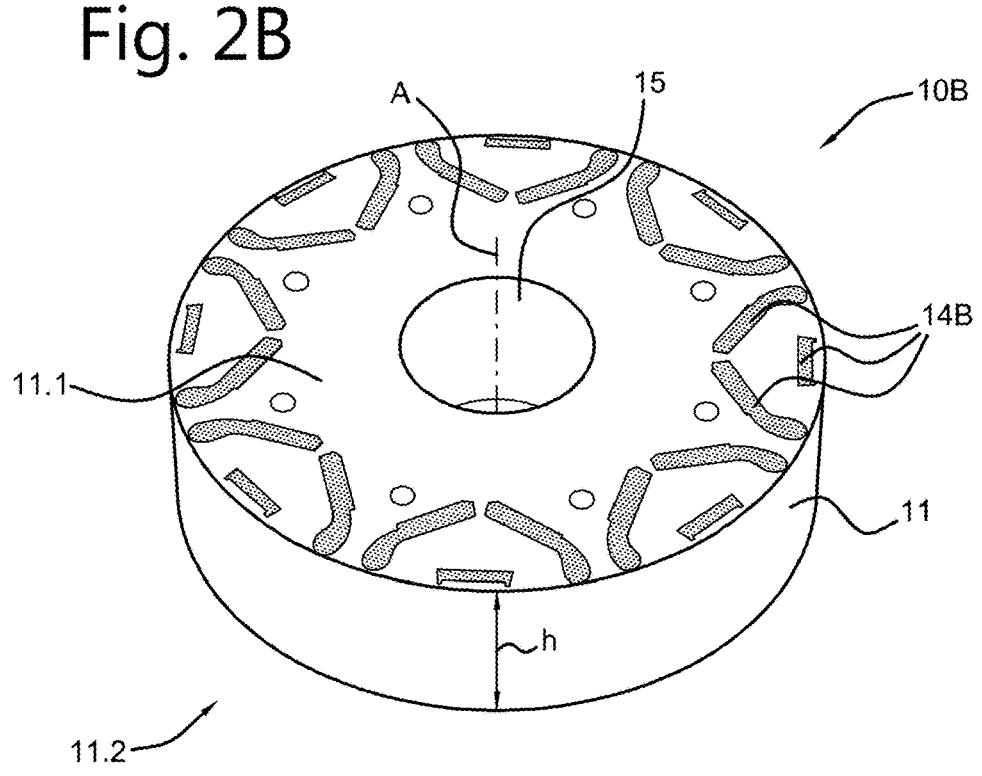
FIG. 2B shows a molded rotor core with the magnets fixed in their magnet cavities by a cured molding material, which corresponds to the unmolded rotor core of FIG. 2A.

FIG. 2A shows another embodiment of a rotor core 10A comprising a rotor core body 11 having magnet cavities 12 distributed around the longitudinal axis A of the rotor core and rotor core body. The magnet cavities 12 extend along the longitudinal axis A between opposing first and second rotor core ends 11.1, 11.2 of the rotor core body. The rotor core body, and therefore the rotor core as well, has a height h as measured between the first and second rotor core ends, and a central opening 15. The magnet cavities 12 each have an opening 12.1 at one or both of the first and second rotor core ends. The openings 12.1 allow inserting permanent magnets 13 into the magnet cavities 12. FIG. 2A shows permanent magnets 13 inserted in respective magnet cavities 12 of the rotor core body 11. The magnets 13 are not yet fixed in the magnet cavities 12 of the rotor core 10A shown in FIG. 2A. In a next manufacturing step of the rotor core, the magnets 13 are fixed in the respective magnet cavities 12 by intro- ducing a fluid molding material, such as a suitable thermo- setting epoxy resin, into the magnet cavities to fill empty parts of the magnet cavities with the fluid molding material. The fluid molding material is subsequently cured to fix the magnets in the magnet cavities. FIG. 2B shows the cured molding material 14B in the magnet cavities. FIG. 2A shows the unmolded rotor core 10A, while FIG. 2B shows the molded rotor core 10B. The molded rotor core 10B is a main part of the rotor provided inside the stator when assembling an electric motor.

Figure 3:
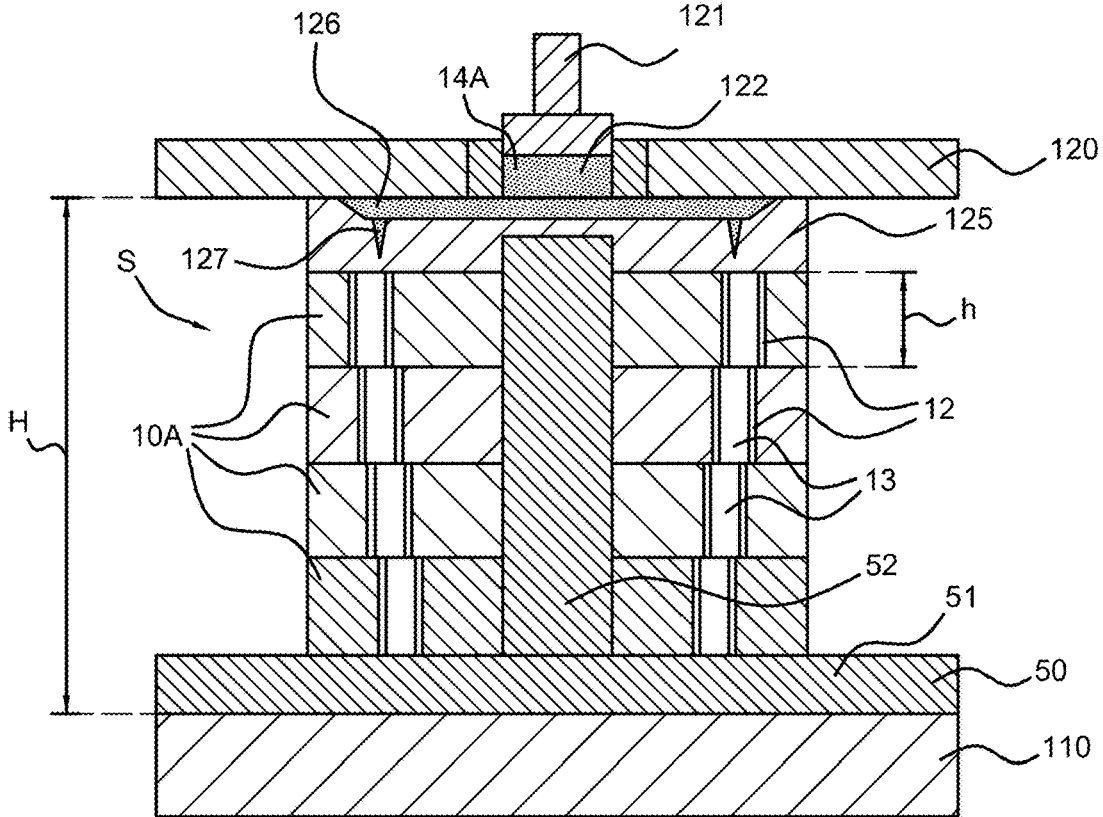
FIG. 3 shows a stack of rotor cores.

A mold assembly for molding rotor cores as described with reference to FIGS. 2A and 2B is shown in FIG. 3. The mold assembly comprises a first mold 110 as a bottom mold and a second mold 120 as a top mold. A stack S of four unmolded rotor cores 10A provided on a mandrel 50 is positioned on the first mold 110. The mandrel 50 has a base plate 51 on which the rotor cores are stacked, and a pin 52 passing through the central openings 15 of the rotor cores to have the rotor cores aligned with respect to one another. FIG. 3 shows that the magnet cavities 12 and corresponding magnets 13 are slightly displaced with respect to another, which is mainly done for illustration purposes to better be able to distinguish the individual rotor cores. The rotor cores are positioned such on one another that the magnet cavities 12 of neighboring rotor cores are aligned. A runner gate plate 125 is placed on top of the stack of rotor cores, and has a central recess for receiving the top of the pin 52 of the mandrel for alignment of the runner plate 125 with the stack of rotor cores. Channels 127 in the runner plate 125 are aligned with the magnet cavities 12 of the top rotor core.

In the embodiment shown, the first mold 110 with the mandrel 50, stack of unmolded rotor cores 10A and runner plate 125 placed thereon, in use, is moved upwards and pressed against the second mold 120. FIG. 3 shows the stack S pressed between the first mold 110 and the second mold 120. A molding material is brought into the reservoir 122 of the second mold 120 and is heated to be provided in a fluid state, after which the plunger 121 is moved downwards to transfer the fluid molding material 14A via channels 126 and 127 in the runner gate plate 125 into the magnet cavities 12 of the rotor core body of the top unmolded rotor core. Since the magnet cavities are aligned, the fluid molding material passes from the magnet cavities 12 of the upper rotor core bodies down to the magnet cavities of the rotor core body of the bottom unmolded rotor core to finally fill the space in the magnet cavities which is not occupied by the magnets 13. The molding material subsequently cures to become solid and fix the magnets 13 in the magnet cavities 12. The stack of rotor core bodies has now become a stack of molded rotor core bodies 10B. The first and second molds 110, 120 of the mold assembly are opened when the molding material has cured by moving the first and second molds away from one another to allow taking the mandrel with the stack of molded rotor core bodies from the first mold 110.

The rotor core molding system and method according to the invention allow molding stacks S of rotor cores of various stack heights, including other elements that can be part of the stack S, such as the mandrel 50 and the runner plate 125, depending on the application. The stack height H may vary as a result of the number (one or more) of rotor cores in the stack, the height h of the individual rotor core(s), and the height of any other element present in the stack. The system and method allow to quickly adapt to processing of a batch of rotor core stacks S having another stack height H than a preceding batch of rotor core stacks and to adapt to a variation in stack height H within a batch. For the purpose of the present disclosure, a stack S may comprise a single rotor core as well. FIGS. 4A to 4F schematically show an embodiment of the rotor core molding method and system 100 of the invention. The rotor core molding system com- prises a frame 150 and first and second molds 110, 120 arranged on the frame. The first mold 110 is movable with respect to the frame 150, while the second mold 120 is fixedly attached to the frame. When closing the first and second molds of the mold assembly, the first mold 110 is moved upward towards the second mold 120. The first mold is moved downward away from the second mold for opening the first and second molds of the mold assembly.

Figure 4A:
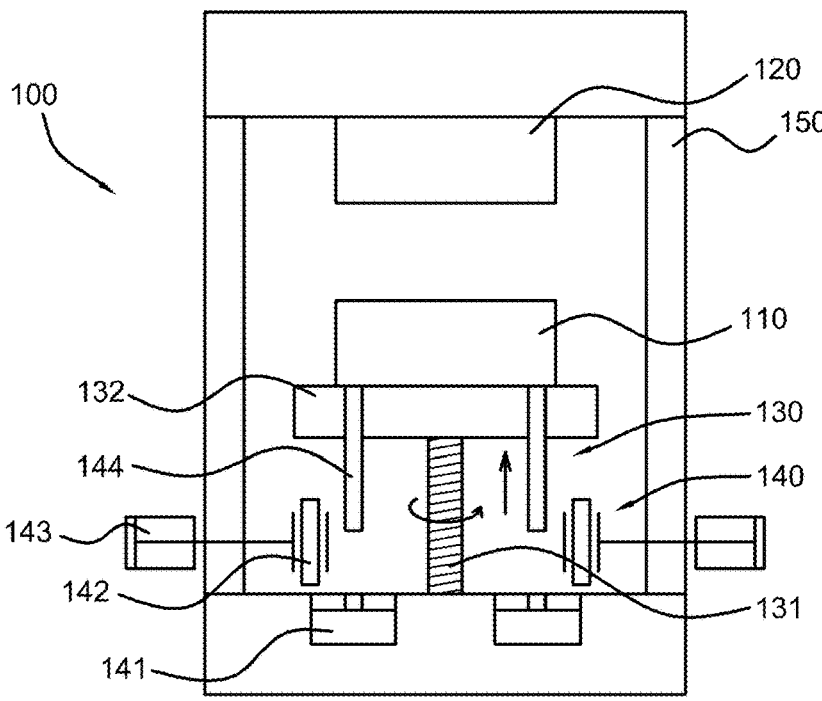
FIGS. 4A to 4F show various stages of an embodiment of the rotor core molding method according to the invention using an embodiment of the rotor core system according to the invention.
Figure 4B:
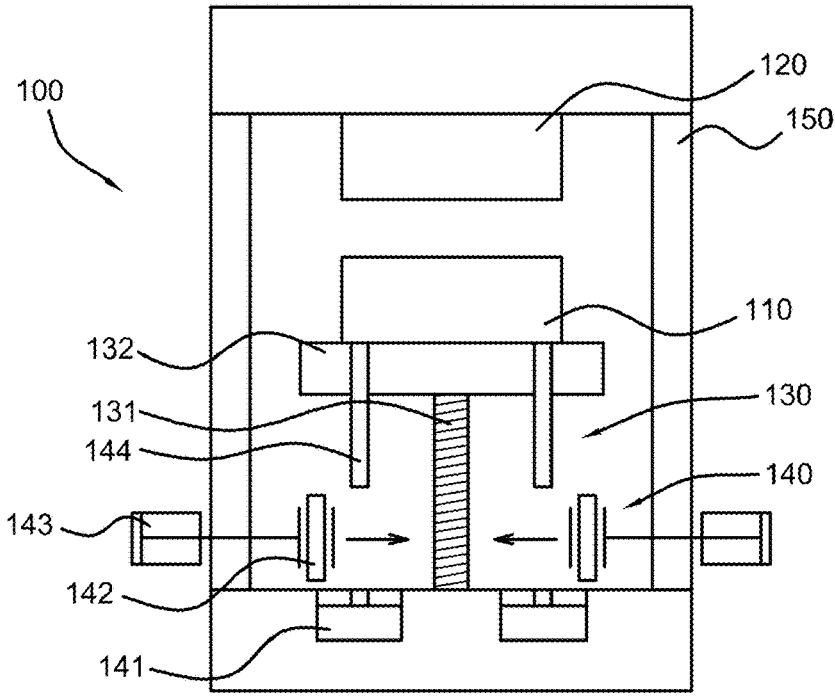

The rotor core molding system 100 comprises a displace- ment mechanism for displacing the first mold and the second mold with respect to one another. The displacement mechanism comprises a pre-adjustment arrangement 130 for pre-adjustment of a distance between the first and second molds in an open configuration to a pre-adjusted distance H0 to define a preset open configura- tion to allow inserting a stack S of unmolded rotor cores having height H, as shown in FIG. 4D. The pre-adjusted distance H0 corresponds to the stack height H plus a clearance distance d. The clearance distance d provides enough space or clearance for inserting the stack S (and removing the stack S) in the preset open configuration of the first and second molds. The pre-adjustment arrangement 130 acts between the frame 150 and the first mold 110. The stack S is intended to also allow comprising a stack of a single rotor core without other elements such as the mandrel and runner plate, such a stack having height H=h, when such elements would be integrated in the first and/or second molds. The preset open configuration of the first and second molds allows placing a stack S in between the molds 110, 120, whereas the molds contact the stack S in a closed configuration. FIG. 4D shows that the distance between the first and second molds 110, 120 is pre-adjusted to the pre-adjusted distance H0 that allows inserting the stack S of the mandrel 50, the stacked four rotor cores and the runner plate 125 of FIG. 3, which has the height H. Therefore, the pre-adjusted distance H0 is larger than the height H.

The pre-adjustment arrangement 130 comprises a pre- adjustment table 132 that can be moved up and down by a spindle drive 131. FIG. 4A shows that the spindle drive 131 is driven to move the pre-adjustment table 132 upward for decreasing a distance between the first and second molds 110, 120 until a distance between the first and second molds which is slightly smaller than the required pre-adjustment distance H0. The first mold 110 is supported by the pre- adjustment table 132 and moves up and down with the pre-adjustment table. In the present case shown in FIG. 4A, the distance between the first and second molds is to be decreased to adjust to another pre-adjusted distance H0. In another case it can be that the distance between the first and second molds 110, 120 is to be increased to set another pre-adjusted distance H0. FIG. 4B shows the situation in which the distance between the first and second molds 110, 120 has been set to a distance slightly smaller than the pre-adjustment distance H0. The first mold 110 is still supported on the pre-adjustment table 132.

The displacement mechanism for displacing the first and second molds with respect to one another further comprises a mold closure arrangement 140. A mold closure pre-adjustment part 144 of the mold closure arrangement 140 is attached to the first mold 110 and is movable with respect to the pre-adjustment table 132. In the embodiment shown in FIGS. 4A to 4F, the mold closure pre-adjustment part 144 is configured as rods that are slidingly guided through the pre-adjustment table 132. The mold closure pre-adjustment part 144 moves together with the first mold 110 when its position is being set by the pre-adjustment table 132. In the situation as shown in FIG. 4B, the mold closure pre-adjustment part 144 is in a decoupled state in which it is decoupled from the frame 150.

The mold closure arrangement 140 further comprises a mold closure coupling part 142 that is movable to be removable out of contact with the mold closure pre-adjustment part 144 to provide for the decoupled state of the mold closure pre-adjustment part, and to be movable into contact with the mold closure pre-adjustment part 144 to provide for the coupled state of the mold closure pre-adjustment part. Additionally, the mold closure arrangement 140 comprises mold closure actuators 141 arranged on the frame 150. In the embodiment shown, the mold closure coupling part 142 comprises coupling rods that are associated with the rods of the mold closure pre-adjustment part 144. In the decoupled state shown in FIG. 4B, the coupling rods of the mold closure coupling part 142 are out of a position in between the mold closure actuators 141 and the rods of the mold closure pre-adjustment part 144. The coupling rods of the mold closure coupling part 142 are movable by actuators 143 in between the positions providing for the decoupled state and the coupled state of the mold closure pre-adjustment part 144. The actuators 143 provide a horizontal movement of the mold closure coupling parts 142, while a vertical movement of the mold closure coupling part 142 is allowed when provided in a position for the coupled state.

Figure 4C:
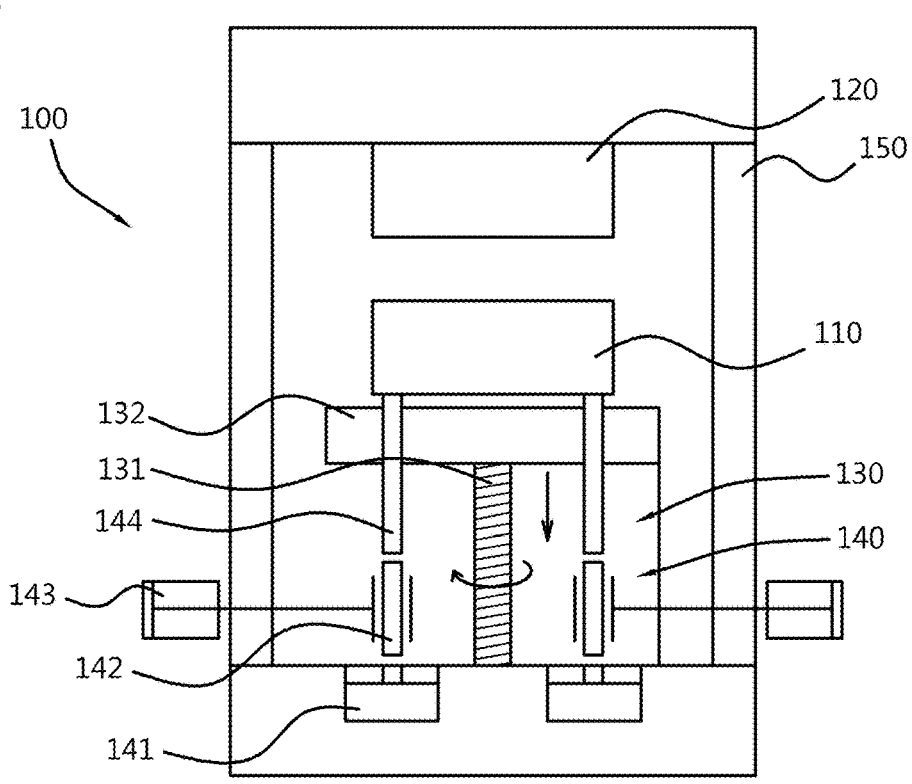
Figure 4D:
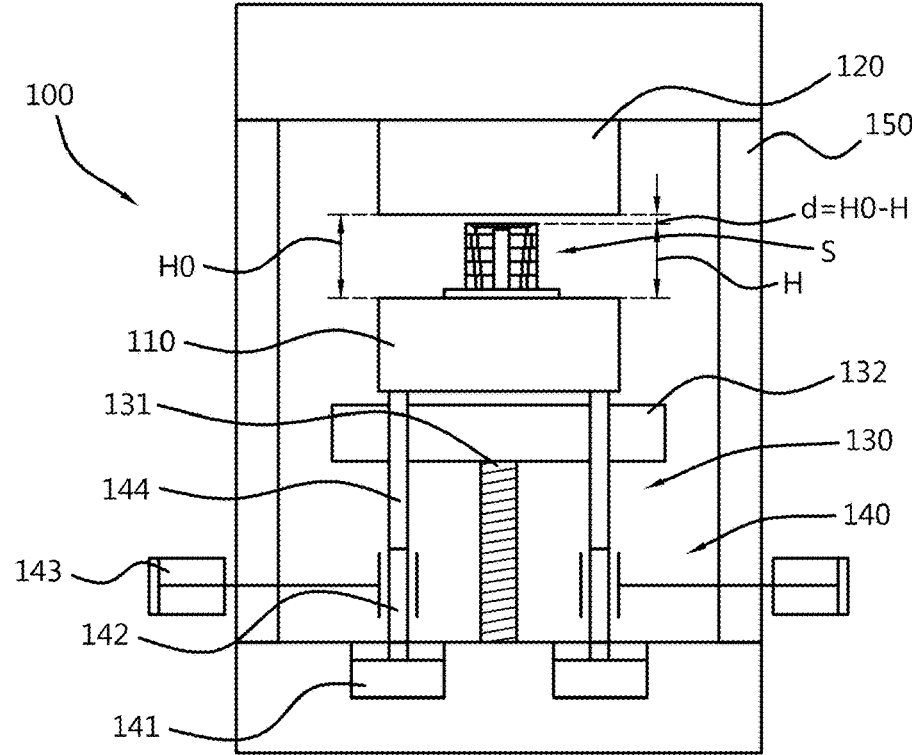

FIG. 4C shows that the coupling rods of the mold closure coupling part 142 have been moved to a position allowing for a coupled state of the mold closure pre-adjustment part 144. However, a coupled state is not yet provided since the coupling rods of the mold closure coupling part 142 are not in contact with both the mold closure actuators 141 and the rods of the mold closure pre-adjustment part 144. FIG. 4D shows the situation in which a coupled state of the mold closure pre-adjustment part 144 has been provided by lowering of the pre-adjustment table 132 by appropriately driving the spindle actuator 131. In this state shown in FIG. 4D, the first mold 110 is not supported anymore by the pre-adjustment table 132 of the pre-adjustment arrangement 130, while being fully supported by the mold closure arrangement 140, especially by the rods 144, 142 of the mold closure arrangement 140. FIG. 4D shows a gap between the first mold 110 and the pre-adjustment table 132. The schematic FIGS. 4A to 4F show the mold closure coupling part 142 and the mold closure pre-adjustment part 144 as comprising rods. However, many other configurations of the mold closure coupling part 142 and the mold closure pre-adjustment part 144 can be envisaged to transfer a translation and pressing force induced by the mold closure actuators 141 to the first mold, while allowing to provide a decoupled state for pre-adjustment to a pre-adjustment position.

Figure 4E:
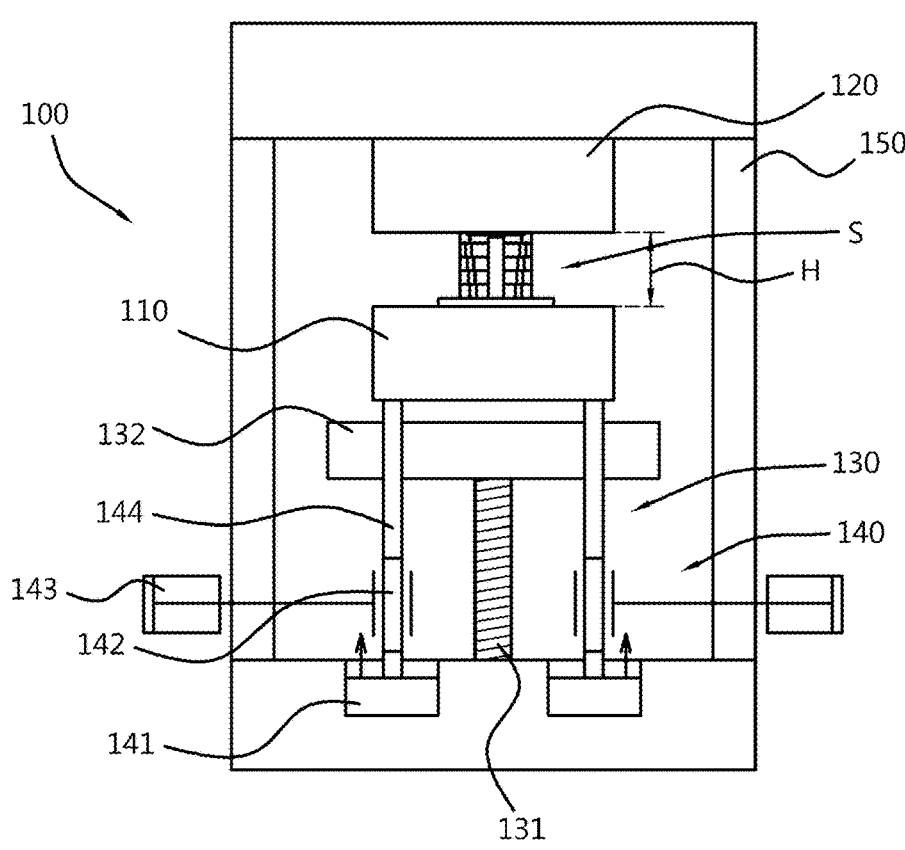

In the situation as shown in FIG. 4D, the first and second molds 110, 120 have been pre-adjusted by the pre-adjustment arrangement 130 to the pre-adjusted distance H0 between the first and second molds 110, 120, which allows inserting a stack S of unmolded rotor cores (including mandrel 50 and runner plate 125) on the first mold 110 in between the first and second molds due to the clearance distance d in addition to the stack height H. Such a stack S having height H and placed on the first mold 110 is shown in FIG. 4D as well. As a next step, the first and second molds 110, 120 of the mold assembly are closed by driving the mold closure actuator 141 of the mold closure arrangement 140 to move the first mold 110 upwards to press the stack S of unmolded rotor cores against the second mold 120, as is shown in FIG. 4E. In the embodiment shown, the mold closure actuator 141 is a servo motor controlled hydraulic drive that allows to provide a clamping force between the first and second molds in the order of 5 to 200 tons. The translation and force by the mold closure actuator 141 are transferred by the mold closure coupling part 142 and the mold closure pre-adjustment part 144 to the first mold 110. Since the mold closure pre-adjustment part 144 is slidingly guided through the pre-adjustment table 132, the first mold 110 moves with respect to the pre-adjustment table.

Figure 4F:
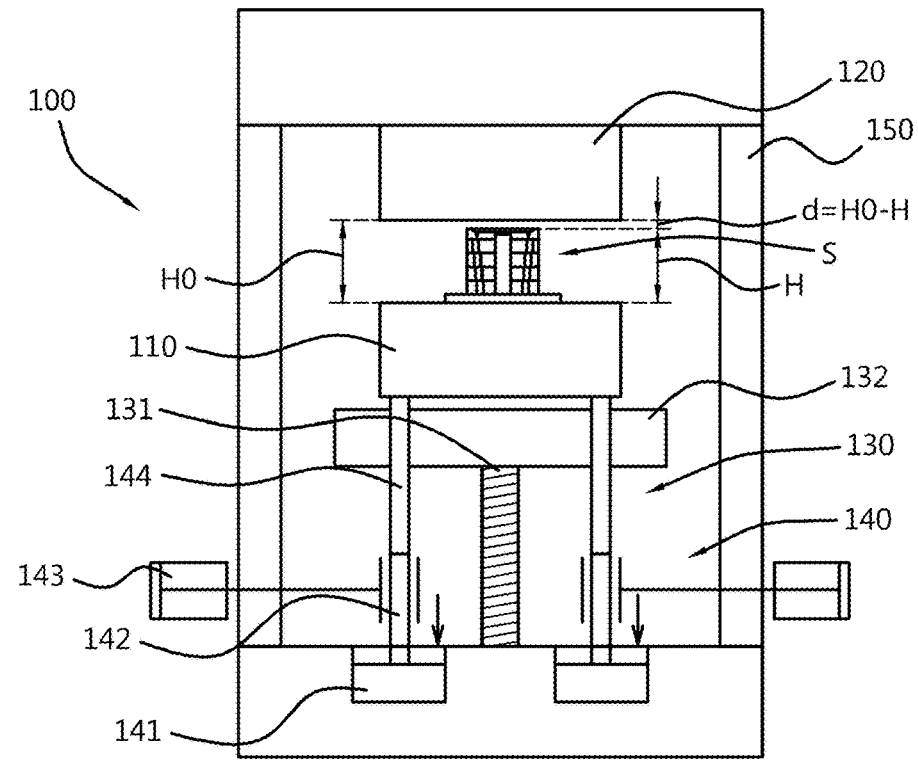

When the first and second molds 110, 120 have been closed as shown in FIG. 4E, a molding material is provided into the magnet cavities and then allowed to cure, as has been described with reference to FIG. 3. Subsequently, the first and second molds 110, 120 are opened again to the preset open configuration by lowering the first mold 110 by appropriately driving the mold closure actuator 141, as shown in FIG. 4F, to allow to remove the stack S of now molded rotor cores. A next stack S of yet unmolded rotor cores is then put onto the first mold 110 in between the first and second molds to repeat the steps described with reference to FIGS. 4D to 4F and to process a batch of stacks S from stacks of unmolded rotor cores to stacks of molded rotor cores.

After processing of such batch of rotor cores, a next batch of stacks of rotor cores having a different height H may be processed. In a next pre-adjustment sequence, the distance between the first and second molds 110, 120 is pre-adjusted to another pre-adjusted distance H0 as has been described above with reference to FIGS. 4A to 4D. When the height H of the stack S of rotor cores of the subsequent batch would be larger than the height of the stack S of rotor cores of the preceding batch, the pre-adjustment position of the first mold 110 has to be lowered to allow for processing of stacks S having a larger stack height H, which is adjusting in an opposite direction as has been described with reference to FIG. 4A. Different coupling rods of the mold closure coupling part 142 are required to allow for a lower pre-adjustment position of the first mold 110. Changing of the coupling rods is thus required. However, in alternative embodiments of the mold closure arrangement 140, one or more coupling elements could be provided that allow for different pre-adjusted positions of the first mold.

The invention claimed is:

1. A rotor core molding method for molding magnets in an unmolded rotor core to provide a molded rotor core for an electric motor, the unmolded rotor core including a rotor core body having magnet cavities distributed around a longitudinal axis of the rotor core body and magnets inserted in the magnet cavities, the magnet cavities extending along the longitudinal axis between opposing first and second rotor core ends of the rotor core body, the rotor core body having a rotor core height as measured between the first and second rotor core ends, the magnet cavities having an opening at one or both of the first and second rotor core ends to allow inserting the magnets and filling of the magnet cavities with a fluid molding material, the molded rotor core including the rotor core body having the magnets fixed in the magnet cavities by a cured molding material in the magnet cavities, the method comprising:

employing a displacement mechanism configured to displace a first mold and a second mold of a rotor core molding system with respect to one another, the rotor core molding system comprising a frame, the first and second molds being disposed on the frame, the displacement mechanism defining an open configuration of the first and second molds for inserting the unmolded rotor core or a stack of unmolded rotor cores, that are stacked with respective first and second rotor core ends onto one another such that magnet cavities of the stacked rotor cores are in communication with one another, in between the first and second molds with the first and second rotor core ends directed towards respective ones of the first and second molds, and for removing the molded rotor core or a stack of molded rotor cores, respectively, from in between the first and second molds, and a closed configuration of the first and second molds for clamping the unmolded rotor core or the stack of unmolded rotor cores, respectively, in between the first and second molds and for passing a fluid molding material into the magnet cavities to provide the molded rotor core or the stack of molded rotor cores, respectively, clamped between the first and second molds, the displacement mechanism comprising a pre-adjustment arrangement and a mold closure arrangement different from the pre-adjustment arrangement, the pre-adjustment arrangement being configured to act between the frame and one of the first and second molds, the mold closure arrangement being configured to act between the frame and said one of the first and second molds to open and to close the first and second molds;

employing the pre-adjustment arrangement to pre-adjust a distance between the first mold and the second mold in a preset open configuration of the first and second molds to a pre-adjusted distance corresponding to a clearance distance plus a height of the unmolded rotor core or the stack of unmolded rotor cores, respectively, to be processed to the molded rotor core or the stack of molded rotor cores, respectively, the pre-adjustment arrangement being configured to provide a relatively long-range distance movement, corresponding to variations in one or more of height of various types of rotor cores and a height of one or more rotor cores of various types of rotor cores;

providing the unmolded rotor core or the stack of unmolded rotor cores between the first and second molds with the first and second rotor core ends directed towards respective ones of the first and second molds;

employing the mold closure arrangement to close the first and second molds from the preset open configuration set by the pre-adjustment arrangement to the closed configuration by moving the first and second molds towards one another to clamp the unmolded rotor core or the stack of unmolded rotor cores with a predetermined pressure in between the first and second molds in the closed configuration, the mold closure arrangement being configured to provide a relatively short-range distance movement corresponding to the clearance distance, and the long-range distance and the short range distance are relative with respect to one another;

providing a fluid molding material into the magnet cavities of the unmolded rotor core or the stack of unmolded rotor cores clamped between the first and second molds;

letting the fluid molding material cure within the magnet cavities to provide one or more molded rotor cores;

employing the mold closure arrangement to open the first and second molds from the closed configuration to the preset open configuration by moving the first and second molds away from one another; and removing the one or more molded rotor cores from between the first and second molds, wherein the mold closure arrangement has a mold closure pre-adjustment part that is attached to said one of the first and second molds and that is movable by the pre-adjustment arrangement in a decoupled state in which the mold closure pre-adjustment part is decoupled from the frame to allow adjusting the distance between the first and second molds to the pre adjusted distance, and that is movable with respect to the pre-adjustment arrangement in a coupled state in which the mold closure pre-adjustment part is coupled to the frame to allow opening and closing the first and second molds by the mold closure arrangement acting on said one of the first and second molds.

2. A rotor core molding system for molding magnets in at least one unmolded rotor core to provide a molded rotor core for an electrical motor, the unmolded rotor core including a rotor core body having magnet cavities distributed around a longitudinal axis of the rotor core body and magnets inserted in the magnet cavities, the magnet cavities extending along the longitudinal axis between opposing first and second rotor core ends of the rotor core body, the rotor core body having a rotor core height as measured between the first and second rotor core ends, the magnet cavities having an opening at one or both of the first and second rotor core ends to allow inserting the magnets and filling of the magnet cavities with a fluid molding material, the molded rotor core comprising the rotor core body having the magnets fixed in the magnet cavities by a cured molding material in the magnet cavities, the molding system comprising:

a frame;

a first mold and a second mold configured to allow clamping the at least one unmolded rotor core between the first and second molds, the first mold and the second mold being disposed on the frame; and a displacement mechanism configured to displace the first mold and the second mold with respect to one another, the displacement mechanism defining an open configuration of the first and second molds for inserting the at least one unmolded rotor core or a stack of unmolded rotor cores, that are stacked with respective first and second rotor core ends onto one another such that magnet cavities of the stacked rotor cores are in communication with one another, in between the first and second molds with the first and second rotor core ends directed towards respective ones of the first and second molds, and to remove a molded rotor core or a stack of molded rotor cores, respectively, from in between the first and second molds, and a closed configuration of the first and second molds for clamping the at least one unmolded rotor core or the stack of unmolded rotor cores, respectively, in between the first and second molds and for passing a fluid molding material into the magnet cavities to provide a molded rotor core or a stack of molded rotor cores, respectively, clamped between the first and second molds, the displacement mechanism comprising a pre-adjustment arrangement configured to pre-adjust and define a distance between the first and second molds in a preset open configuration of the first and second molds to a pre-adjusted distance corresponding to a clearance distance plus a height of the at least one unmolded rotor core or the stack of unmolded rotor cores, respectively, to be processed to the molded rotor core or the stack of molded rotor cores, respectively, the pre-adjustment arrangement being configured to provide a relatively long-range distance movement, corresponding to variations in one or more of height of various types of rotor cores and a height of one or more rotor cores of various types of rotor cores, the pre-adjustment arrangement being configured to act between the frame and one of the first and second molds, and a mold closure arrangement different from the pre-adjustment arrangement and configured to close the first and second molds from the preset open configuration set by the pre-adjustment arrangement to the closed configuration by moving the first and second molds towards one another to clamp the unmolded rotor core or the unmolded rotor cores provided between the first and second molds with a predetermined pressure in between the first and second molds in the closed configuration, and to open the first and second molds from the closed configuration to the preset open configuration by moving the first and second molds away from one another, the mold closure arrangement being configured to provide a relatively short-range distance movement corresponding to the clearance distance, and the long-range distance and the short range distance are relative with respect to one another, wherein the mold closure arrangement is configured to act between the frame and said one of the first and second molds to open and to close the first and second molds, the mold closure arrangement having a mold closure pre-adjustment part that is attached to said one of the first and second molds and that is movable by the pre-adjustment arrangement in a decoupled state in which the mold closure pre-adjustment part is decoupled from the frame to allow adjusting the distance between the first and second molds to the pre adjusted distance, and that is movable with respect to the pre-adjustment arrangement in a coupled state in which the mold closure pre-adjustment part is coupled to the frame to allow opening and closing the first and second molds by the mold closure arrangement acting on said one of the first and second molds.

3. The molding method according to claim 1, wherein the mold closure arrangement comprises a mold closure actuator to open and to close the first and second molds.

4. The molding method according to claim 1, wherein the mold closure arrangement comprises a mold closure coupling part that is configured and arranged to allow coupling the mold closure pre-adjustment part to the frame to provide the coupled state of the mold closure pre-adjustment part, and decoupling the mold closure pre-adjustment part from the frame for providing to provide the decoupled state of the mold closure pre-adjustment part.

5. The molding method according to claim 4, wherein the mold closure coupling part is movable to be removable out of contact with the mold closure pre-adjustment part to provide for the decoupled state of the mold closure pre-adjustment part, and to be movable into contact with the mold closure pre-adjustment part to provide for the coupled state of the mold closure pre-adjustment part.

6. The molding method according to claim 3, wherein the mold closure actuator is provided on the frame, and the mold closure coupling part is configured and arranged to be removable from a position between the mold closure actuator and the mold closure pre-adjustment part to provide for the decoupled state of the mold closure pre-adjustment part, and to be insertable into a position between the mold closure actuator and the mold closure pre-adjustment part to provide for the coupled state of the mold closure pre-adjustment part.

7. The molding method according to claim 6, wherein the mold closure coupling part comprises at least one movable rod.

8. The molding method according to claim 1, wherein the pre-adjustment arrangement comprises a pre-adjustment actuator to adjust the distance between the first and second molds to the pre-adjusted distance.

9. The molding method according to claim 8, wherein the pre-adjustment actuator comprises a mechanical displacement drive, optionally a spindle drive, optionally a servo-controlled spindle drive.

10. The molding method according to claim 1, wherein the pre-adjustment arrangement comprises a pre-adjustment table configured to support one of the first and second molds to allow pre-adjusting a distance between the first and second molds.

11. The molding method according to claim 8, wherein the molding system comprises a frame, the first and second molds are disposed on the frame, and the pre-adjustment arrangement is configured to act between the frame and one of the first and second molds, wherein the pre-adjustment arrangement comprises a pre-adjustment table configured to support one of the first and second molds to allow pre-adjusting a distance between the first and second molds, and wherein the pre-adjustment actuator acts between the frame and the pre-adjustment table.

12. The molding system according to claim 2, wherein the mold closure arrangement comprises a mold closure actuator to open and to close the first and second molds.

13. The molding system according to claim 2, wherein the mold closure arrangement comprises a mold closure coupling part that is configured and arranged to allow coupling the mold closure pre-adjustment part to the frame to provide the coupled state of the mold closure pre-adjustment part, and decoupling the mold closure pre-adjustment part from the frame to provide the decoupled state of the mold closure pre-adjustment part.

14. The molding system according to claim 13, wherein the mold closure coupling part is movable to be removable out of contact with the mold closure pre-adjustment part to provide for the decoupled state of the mold closure pre-adjustment part, and to be movable into contact with the mold closure pre-adjustment part to provide for the coupled state of the mold closure pre-adjustment part.

15. The molding system according to claim 2, wherein the mold closure actuator is provided on the frame, and the mold closure coupling part is configured and arranged to be removable from a position between the mold closure actuator and the mold closure pre-adjustment part to provide for the decoupled state of the mold closure pre-adjustment part, and to be insertable into a position between the mold closure actuator and the mold closure pre-adjustment part to provide for the coupled state of the mold closure pre-adjustment part.

16. The molding system according to claim 15, wherein the mold closure coupling part comprises at least one movable rod.

17. The molding system according to claim 2, wherein the pre-adjustment arrangement comprises a pre-adjustment actuator to adjust the distance between the first and second molds to the pre adjusted distance.

18. The molding system according to claim 17, wherein the pre-adjustment actuator comprises a mechanical displacement drive, optionally a spindle drive, optionally a servo-controlled spindle drive.

19. The molding system according to claim 2, wherein the pre-adjustment arrangement comprises a pre-adjustment table configured to support one of the first and second molds to allow pre-adjusting a distance between the first and second molds.

20. The molding system according to claim 17, wherein the molding system comprises a frame, the first and second molds are disposed on the frame, and the pre-adjustment arrangement is configured to act between the frame and one of the first and second molds, wherein the pre-adjustment arrangement comprises a pre-adjustment table configured to support one of the first and second molds to allow pre-adjusting a distance between the first and second molds, and wherein the pre-adjustment actuator acts between the frame and the pre-adjustment table.

\* \* \* \* \*